United States Patent
Mizes et al.

(10) Patent No.: US 7,095,531 B2
(45) Date of Patent: Aug. 22, 2006

(54) SYSTEMS AND METHODS FOR COMPENSATING FOR STREAKS IN IMAGES

(75) Inventors: Howard A. Mizes, Pittsford, NY (US); Robert M. Lofthus, Webster, NY (US)

(73) Assignee: Xerox Corporation, Stamford, CT (US)

( * ) Notice: Subject to any disclaimer, the term of this patent is extended or adjusted under 35 U.S.C. 154(b) by 301 days.

(21) Appl. No.: 10/701,475

(22) Filed: Nov. 6, 2003

(65) Prior Publication Data

US 2005/0099446 A1 May 12, 2005

(51) Int. Cl.
H04N 1/409 (2006.01)
H04N 1/58 (2006.01)

(52) U.S. Cl. .............. 358/1.9; 358/3.26; 358/504; 358/534; 358/406; 358/463

(58) Field of Classification Search ............ 358/1.9
See application file for complete search history.

(56) References Cited

U.S. PATENT DOCUMENTS

| | | | |
|---|---|---|---|
| 5,177,621 A | 1/1993 | Ohtaki et al. | 358/406 |
| 5,543,896 A | 8/1996 | Mestha | 355/208 |
| 5,546,165 A | 8/1996 | Rushing et al. | 358/298 |
| 5,649,073 A | 7/1997 | Knox et al. | 358/298 |
| 5,710,836 A | 1/1998 | Shiau et al. | 358/456 |
| 6,035,152 A | 3/2000 | Craig et al. | 399/49 |
| 6,249,357 B1 | 6/2001 | Metcalfe et al. | 358/451 |
| 6,819,352 B1 * | 11/2004 | Mizes et al. | 347/251 |

* cited by examiner

Primary Examiner—Stephen Meier
Assistant Examiner—Julian D. Huffman
(74) Attorney, Agent, or Firm—Oliff & Berridge, PLC

(57) ABSTRACT

Defects in an image forming system may give rise to visible streaks, or one-dimensional defects in an image that run parallel to the process direction. One known method for compensating for streaks introduces a separate tone reproduction curve for each pixel column in the process direction. A compensation pattern according to this invention has a plurality of halftone regions that are lead by, trained by, and separated by rows of fiducial marks. The fiducial marks allow the printer pixel grid and a scanning pixel grid to be correlated. The gray level in each pixel column of each gray level portion is measured and analyzed to produce a local tone reproduction curve for each pixel column and associated line width. The local tone reproduction curves are then used to compensate for the streak defect when printing.

41 Claims, 9 Drawing Sheets

SYSTEMS AND METHODS FOR COMPENSATING FOR STREAKS IN IMAGES

BACKGROUND OF THE INVENTION

1. Field of Invention

This invention relates to systems and methods for reducing print defects in images.

2. Description of Related Art

Defects in the subsystems of a xerographic, electrophotographic or similar image forming system, such as a laser printer, digital copier or the like, may give rise to visible streaks in a printed image. Streaks are primarily one-dimensional defects in an image that run parallel to the process direction. Typical defects might arise from a non-uniform LED imager, contamination of the high voltage elements in a charger, scratches in the photoreceptor surface, etc. In a uniform patch of gray, streaks and bands may appear as a variation in the gray level. In general, "gray" refers to the intensity value of any single color separation layer, whether the toner is black, cyan, magenta, yellow or some other color.

One method of reducing such streaks is to design and manufacture the critical parameters of the marking engine subsystems to tight specifications. Often though, such precision manufacturing will prove to be cost prohibitive.

A tone reproduction curve (TRC) may be measured by printing patches of different bitmap area coverage. In some digital image processing applications, the reflectivity of a patch of gray is measured with a toner area coverage sensor. The manner of operation of the toner area coverage sensor is described in U.S. Pat. No. 4,553,033, which is incorporated herein by reference in its entirety. Toner area coverage sensors are typically designed with an illumination beam much larger than the halftone screen dimension. This large beam does not provide the resolution for the toner area coverage sensor to be useful as a sensor for the narrow streaks that may occur for poorly performing subsystems.

U.S. Pat. No. 6,760,056 by Klassen et al, incorporated herein by reference in its entirety, discloses one exemplary embodiment of a method for compensating for streaks by introducing a separate tone reproduction curve for each pixel column in the process direction. A compensation pattern is printed and then scanned to first measure the ideal tone reproduction curve and then detect and measure streaks. The tone reproduction curves for the pixel columns associated with the streak are then modified to compensate for the streak.

SUMMARY OF THE INVENTION

In implementing the methods and systems of the 573 patent application, the inventors of this invention discovered additional problems that needed to be solved before the streaks could be acceptably compensated for. For example, for very narrow streaks, any misalignment greater than half a pixel between a scanner pixel grid used to measure the compensation pattern and the pixel grid of the image forming device that printed the compensation pattern prevents proper compensation of the streak. Additionally, properly adjusting of the tone reproduction curve requires a greater gray level resolution in halftone intensity than is often available. Furthermore, noise in the scanning and printing process makes is difficult to adequately calibrate the streak defects in a single compensation process.

This invention provides systems and methods that compensate for the pixel misalignment.

This invention separately provides a compensation pattern and associated compensation analysis systems and methods that use a plurality of halftone regions separated by sets of alignment or fiducial marks.

This invention separately provides a compensation pattern and associated compensation analysis systems and methods that use a plurality of single halftone value halftone regions.

This invention separately provides systems and methods for generating a plurality of local tone reproduction curves based on a plurality of distinct halftone regions.

This invention separately provides systems and methods that determine a relationship between an ideal or desired tone reproduction curve and an actual tone reproduction curve for at least some pixel locations across the process direction.

This invention separately provides systems and methods that compensate for the departure of the actual tone reproduction curve from an ideal tone reproduction curve for at least some pixel locations across the process direction.

This invention separately provides systems and methods that provide tone reproduction curve compensation at a resolution greater than the halftone gray level resolution by dithering between available halftone levels.

This invention separately provides systems and methods that reduce the effects of scanner noise on the compensation process.

This invention separately provides systems and methods that iteratively measure the actual tone reproduction curve and the magnitude of the streak defects, while incrementally applying compensation to the tone reproduction curves of at least some pixel locations across the process direction.

This invention separately provides a compensation pattern that has fiducial marks before and after each halftone test region.

In various exemplary embodiments, the systems and methods according to this invention, a compensation pattern, that has a plurality of halftone regions separated by sets of alignment or fiducial marks, is printed by the printing system and then scanned on a flatbed scanner. The fiducial marks provide alignment between the printer pixel grid and the scanner pixel grid. Each pixel column in each halftone region is identified using the fiducial marks. The gray level in each pixel column of each halftone region is measured. Then, the measured gray levels are aligned and interpolated to produce a local tone reproduction curve for each pixel column. The local tone reproduction curves are then used to compensate for the streak defect when printing.

In various exemplary embodiments, the systems and methods according to this invention reduce noise effects encountered during measurement by repeatedly measuring the compensation required and averaging out the noise. This is done by incrementally applying a fraction of the necessary compensation determined by the local tone reproduction curves, then reprinting and scanning the compensation pattern. The process is iterated until the additional compensation required is negligible.

In various exemplary embodiments, the systems and methods according to this invention interpolate the required printed compensation between available gray level resolutions of the printer. The actual printed halftones in a pixel column are alternated between higher and lower gray levels available given the printer resolution. The resulting average printed gray level of the pixel column is the gray level required to compensate acceptably for the streak defect.

In various exemplary embodiments, the systems and methods according to this invention apply the compensation for color printers to each individual color separation layer individually.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The compensation technique described herein can be applied to both color and monochrome image forming devices. For monochrome image forming devices, the technique is as described below. Color monochrome image forming devices operate by overlaying different color separation layers. Each color separation layer is individually compensated for using the techniques described herein. As used herein, the term "gray" indicates the amount of coverage of material between zero and 100% density on the printed surface, although in general this material may be colored.

An input gray level is typically an integer between 0 and 255 that is sent to the marking engine from a computer, an input scanner or other image data source. An actual gray level is the response of a sensor measuring the gray level of the printed image. The actual gray level can be a function of distance in the cross-process direction. The desired gray level is defined as the response of the sensor to what the marking engine was designed to print. The desired gray level is independent of position for a uniform gray strip, and, for example, can be the average of all the actual gray levels. The desired gray level can also be a target value that the marking engine is designed to print.

The desired gray level, as a function of the input gray level, defines an intended tone reproduction curve. The actual gray level as a function of the input gray level defines a local tone reproduction curve. A local reproduction curve exists for each pixel location in the printed image in the cross-process direction. Thus, for example, a 600-spi printer that is 11 inches wide would have one desired tone reproduction curve and 6600 (600×11) local tone reproduction curves, one for each of the 6600 different pixel locations.

Figure 1:
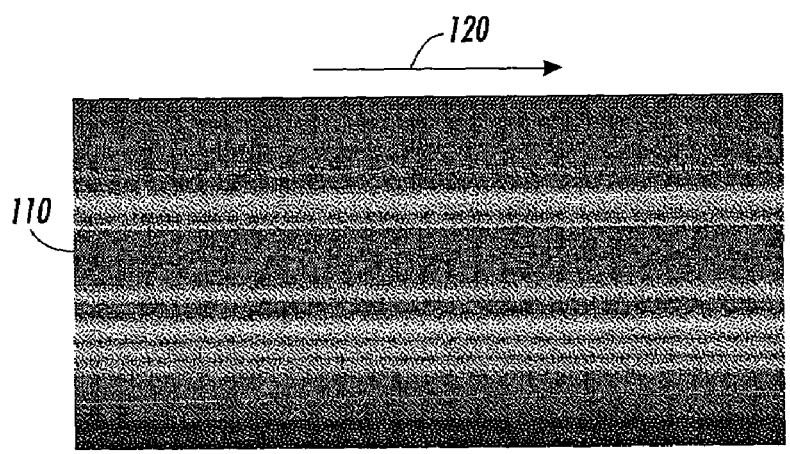
FIG. 1 illustrates an image that contains streak print defects.

FIG. 1 illustrates an image patch having a single gray level value that contains a number of streak defects. Each streak defect extends along a process or slow-scan direction, while the various different streak defects are adjacent to each other along a cross-process or fast-scan direction. That is, FIG. 1 shows a printed uniform patch of gray 110 that contains streaks. As shown in FIG. 1, the streaks run parallel to the process direction 120. The magnitude of the streaking or the difference in toner density is a function of position perpendicular to the process direction. All pixels in a column that is parallel to the process direction and that is a given distance in the cross-process direction from a reference location will experience a same shift in intensity due to the streak defect.

In various exemplary embodiments, the systems and methods according to this invention compensate for streaks or improper toner density regions that run the length of the process direction and have a constant lighter or darker intensity than adjacent regions of the same intended intensity.

Figure 2:
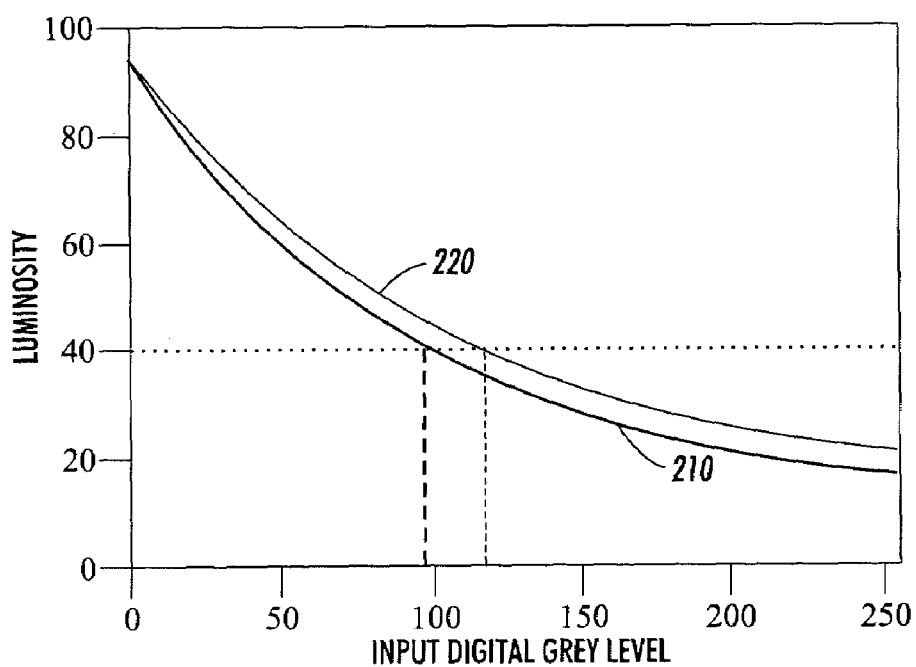
FIG. 2 is a graph illustrating an ideal tone reproduction curve and an actual toner reproduction response for a single pixel location.

FIG. 2 is a graph of several curves that show luminosity, a measure of the printed toner density, as a function of the input gray level. The ideal or intended tone reproduction curve 210 indicates the output luminosity as a function of input gray level in all pixel columns if no streak defects are present. The actual tone reproduction curve 220 is an example of actual output luminosity as a function of input gray level for a pixel column which experiences a streak defect.

That is, FIG. 2 shows a typical plot of the actual gray level for one local tone reproduction curve 220. If the printer response at this pixel were accurate, the plot of the actual gray level would match the plot of the ideal or intended tone reproduction curve 210 at all positions. Deviations of this local tone reproduction curve 220 from the ideal or intended tone reproduction curve 210 quantify the degree of streaking at all gray levels. Based on the ideal tone reproduction curve 210, if an image portion having a gray level output of 40 is desired, under ideal conditions, to obtain the desired gray level output, a xerographic or electrographic image forming system would need to print that image portion at a gray level of 117. Based on the actual tone reproduction curve 210, if the image portion having a gray level output of 40 is desired, to obtain the desired gray level output at this pixel location, the xerographic or electrographic image forming system would need to print that image portion at a gray level of 97. That is, the image data defining that image portion should be changed to instruct the xerographic or electrographic image forming system to print that image portion at a gray level of 97 at that pixel location. In practice, some parameterization of the two tone reproduction curves 210 and 220 shown in FIG. 2 are stored in memory and are used to modify the gray level defined by the image data for any gray level for this pixel location to achieve the desired gray level in the printed image portion.

In various exemplary embodiments, to compensate for the streak defects, the input gray level is changed using different local tone reproduction curves, where one local tone reproduction curve exists for each pixel in the cross-process direction, so that the actual gray level matches the desired gray level at every pixel location. This requires the ability to accurately determine the actual gray level at every pixel location in the cross-process direction. Spatial non-uniformities in a sensor may cause a discrepancy between the pixel location where the sensor measuring system or image forming system thinks the image is being measured at and the pixel location where the measurement is actually occurring. If this error occurs, then the compensation will be applied to the wrong pixel location. As a result, narrow streaks, such as the one illustrated in FIGS. 3 and 4, will not be properly compensated for.

In the example shown in FIG. 2, to achieve a constant luminosity of 40, the input gray level value for the pixel column experiencing the streak defect must be raised to a value 117 from the value 97 determined using the ideal tone reproduction curve. In the methods and systems of the 573 patent, the input gray level is adjusted for each pixel by multiplying the input gray level for that pixel by a compensation parameter that is selected depending on the pixel location and the input level. The ideal tone reproduction curve is then applied to the compensated input image or gray level value to convert from the input gray level value to the printer dependant gray level value.

Figure 4:
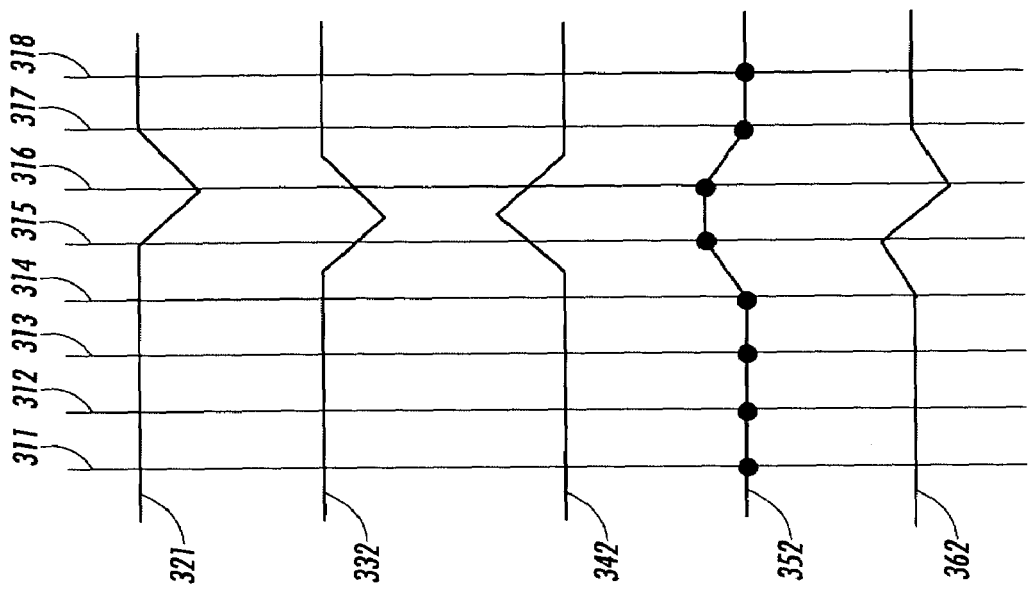
FIGS. 3 and 4 graphically illustrate the effect of a half-pixel misalignment on the streak defect compensation.
Figure 3:
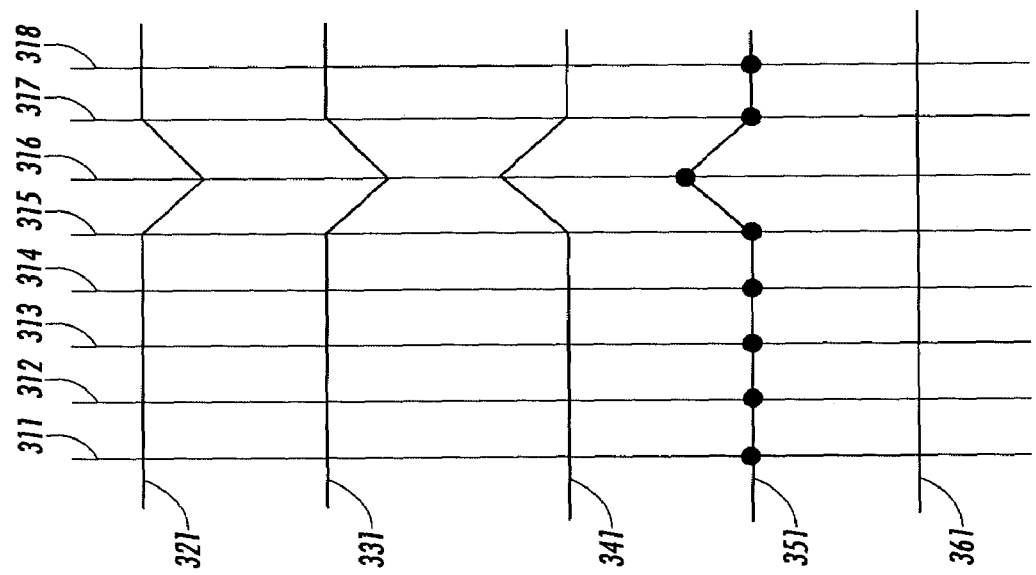

FIG. 3 and FIG. 4 graphically illustrate several curves that demonstrate streak compensation with proper and improper pixel alignment between the printer pixel grid and the pixel grid in the compensation data. The actual printed toner density values 321 shown in FIG. 3 and FIG. 4 are generated from a constant intensity input and are a function of the pixel columns 311–318. A streak defect in the actual printed toner density values 321, i.e., a different actual printed toner intensity value than the desired printed toner density values obtained at the pixel columns 311–315, and 317 and 318, is seen at the pixel column 316.

FIG. 3 shows the scan data toner density values 331 obtained by scanning the printed compensation pattern in the scan data when the pixel alignment between the printer pixel grid and the pixel grid in the compensation data is appropriately aligned. The streak defect, i.e., the different actual printed toner density is also seen at the pixel column 316 of the scan data toner density values 331. An appropriately compensated input gray level curve 341 is also shown in FIG. 3, which has a difference in the intensity value for the pixel column 316 that is opposite the difference in the actual printed toner density value for the pixel column 316 that occurs in the scan data toner density values 331 that compensates for the streak defect.

When the compensated input gray level curve 341 is sampled at the printer pixel column positions, the appropriately aligned compensated halftone density curve 351 also shows the different density in, or intensity values for, the pixel column 316. When the halftone density curve 351 is used in the printing process, the output density curve 361 has the desired constant density for all of the pixel columns 311–318.

FIG. 4 shows the scan data toner density values 332 obtained by scanning the printed compensation pattern when the pixel alignment between the printer pixel grid and the pixel grid in the compensation data is misaligned by one-half pixel. The streak defect in the actual printed toner density values, i.e., the difference in the actual printed toner density values, is now seen in scan data toner density values 332 as occurring between the pixel columns 315 and 316. As a result, a misaligned compensated input gray level curve 342, also shown in FIG. 4, is generated from the misaligned scan data toner density values 332. In particular, the misaligned compensated gray level curve 342, which has a difference in the intensity values for the pixel columns 315 and 316 that is opposite the difference in the scan data toner density values 332, but which is not aligned with the location of the different value, i.e., pixel column 316, of the actual printed toner density values 321.

When the input gray level curve 342 is sampled at the printer pixel column positions 311–318, using linear interpolation between the discrete pixels, the misaligned compensated halftone density curve 352 indicates that a density of half the density needed to appropriately compensate for the streak defect, and that the compensation needs to be applied to both of the pixel columns 315 and 316. When the resulting halftone density curve 352 is used in the printing process, the output density curve 362 for the pixel column 315 is over, or unnecessarily, compensated and is under compensated for the pixel column 316. While the original streaking shown in the actual printed toner density values 321 has been modified, detectable streaking may still be seen in the output density values 362.

Figure 5:
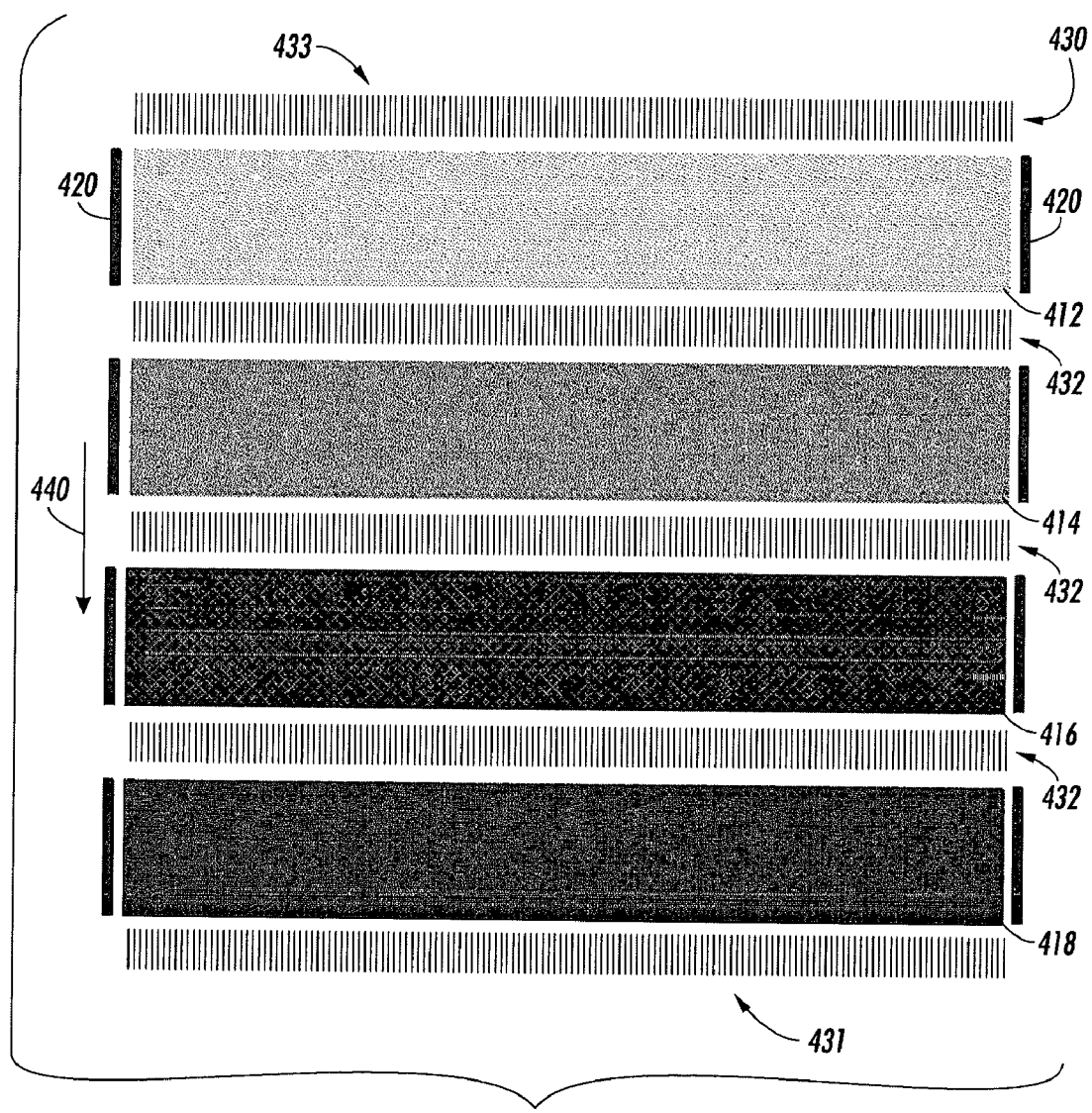
FIG. 5 illustrates a portion of one exemplary one embodiment of a compensation pattern usable to determine one or more parameters used in streak printing defect compensation according to this invention.

FIG. 5 shows one exemplary embodiment of a compensation pattern that allows the misalignment between the image forming device pixel grid and the scanning grid to be taken into account when determining the streak defect compensation parameters. The compensation pattern shown in FIG. 5 includes a number of halftone strips 412–418, laterally placed edge locator lines 420 and repeating sets of fiducial marks 430, including a leading set or row 431, a plurality of interstitial sets or rows 432 and a trailing set or row 433. Each halftone strip 412–418 is a region of constant gray level. Each halftone strip 412–418 has a gray level that is different from the gray level of the other strips 412–418. It should be appreciated that the difference in gray level between adjacent halftone strips does not have to be a constant. Rather, in various exemplary embodiments, the gray level increment between various ones of the halftone strips 412–418 is small where the tone reproduction curve changes rapidly and large where the tone reproduction curve changes slowly.

The number of halftone strips 412–418 desired in a compensation pattern should be large enough to finely sample the tone reproduction curve. Four halftone strips 412–418 are shown in FIG. 5. However, it should be appreciated that any number of halftone strips can be used. For example, in one exemplary embodiment, 32 strips were used to successfully implement the streak defect compensation process according to this invention. The halftone strips 412–418 extend sufficiently along the process direction 440 to allow for a sufficiently accurate estimate of the gray level in each pixel column and to average out any noise that occurs when forming and/or scanning the halftone strips 412–418. It should be appreciated that any design trading streak defect compensation performance against the cost of compensation pattern size and/or the cost of analyzing the scanned compensation pattern, by using differing numbers and lengths of halftone strips 412–418, is within the scope of this invention.

When each pixel column in a given halftone strip 412–418 is averaged over its length in the process direction 440, the periodicity of the halftone in the cross-process direction will appear in the cross section of the pixel columns. The amplitude of this cross-process halftone repeat is reduced if the length of the halftone strips 412–418 in the process direction is also an integer multiple of the halftone periodicity in the process direction.

The edge locator lines 420 are used to identify the lateral boundaries or sides of each compensation strip 412–418. Alternatively, the lateral boundaries of the compensation strips can be found with reference to the fiducial marks 430. The fiducial marks 430 are used to align the scanning coordinates of the pixel columns to the coordinates of the pixel columns in the printed image, i.e., associate a scanner pixel location along the cross-process direction with the corresponding cross-process-direction image-forming device pixel location. If the fiducial marks 430 are single-pixel lines, the centroids of those single-pixel lines will give the location of those image forming device pixels in scanning coordinates. If the fiducial marks 430 are two-pixel lines, the centroids of those lines will give the location of the midpoints between those image forming device pixels in the scanning coordinates. If the fiducial marks 430 are 3 or more pixels wide, the centroid of the fiducial mark 430 will give the digital center of the group of pixels composing that fiducial mark 430.

In the exemplary embodiment shown in FIG. 5, a first set of fiducial marks is provided before the first compensation strip 412, one intermediate set of fiducial marks is provided between each pair of adjacent compensation strips 412–414, 414–416, and 416–418, and a last set of fiducial marks is provided after the last compensation strip 418. However, it should be appreciated that fewer (or even more) sets of fiducial marks can be provided. For example, in various exemplary embodiments, the first and/or last sets of fiducial marks can be omitted. Similarly, in various other exemplary embodiments, one or more of the intermediate sets of fiducial marks can be omitted. In general, so long as there are sufficient sets of fiducial marks to be able to accurately align the scanning coordinates of the pixel columns to the coordinates of the pixel columns in the printed image and to be able to accurately determine the image value of a given compensation strip for a given scanner pixel location along the cross-process direction, any number of the sets of fiducial marks may be omitted.

In various exemplary embodiments, the centroids of the fiducial marks 430 are found by finding, for each fiducial mark 430, a scan pixel with a minimum reflectance about that fiducial mark 430. In various exemplary embodiments, for each of the fiducial marks 430, a quadratic fit using the corresponding located scan pixel and two neighboring scan pixels to that scan pixel can be performed. The minimums of each of these quadratic fits are determined to be the centroids of the particular fiducial mark 430.

If the fiducial marks 430 are single-pixel lines, the centroids of those single-pixel lines will give the location of those image forming device pixels in scanning coordinates. If the fiducial marks 430 are two-pixel lines, the centroids of those lines will give the location of the midpoints between those image forming device pixels in the scanning coordinates. Either way, this information provides the conversion between the scanner coordinates and the printer coordinates for the associated scanner pixels and printer pixels, i.e., between the cross-process-direction scanner pixel columns and the cross-process-direction image-forming device pixel locations.

In various exemplary embodiments, the fiducial marks 430 are placed as closely as possible to the halftone strips 412–418 to maximize alignment accuracy. In various exemplary embodiments, the fiducial marks 430 are also placed before and after each halftone strip 412–418. Skew in the printing process, motion quality errors, rotation of the printed image on the scanner, and/or other errors may give a slightly different mapping for each set of fiducial marks 430. If two different maps are obtained for the fiducial marks 430 above and below a halftone strip, linear interpolation is used to determine the gray level of each scanner pixel column. The results of this image analysis is a table of $N_s$ by $N_p$, where $N_s$ is the number of different gray level portions or strips of the compensation pattern and $N_p$ is the number of scanner pixel locations or columns along the cross-process direction.

Figure 6:
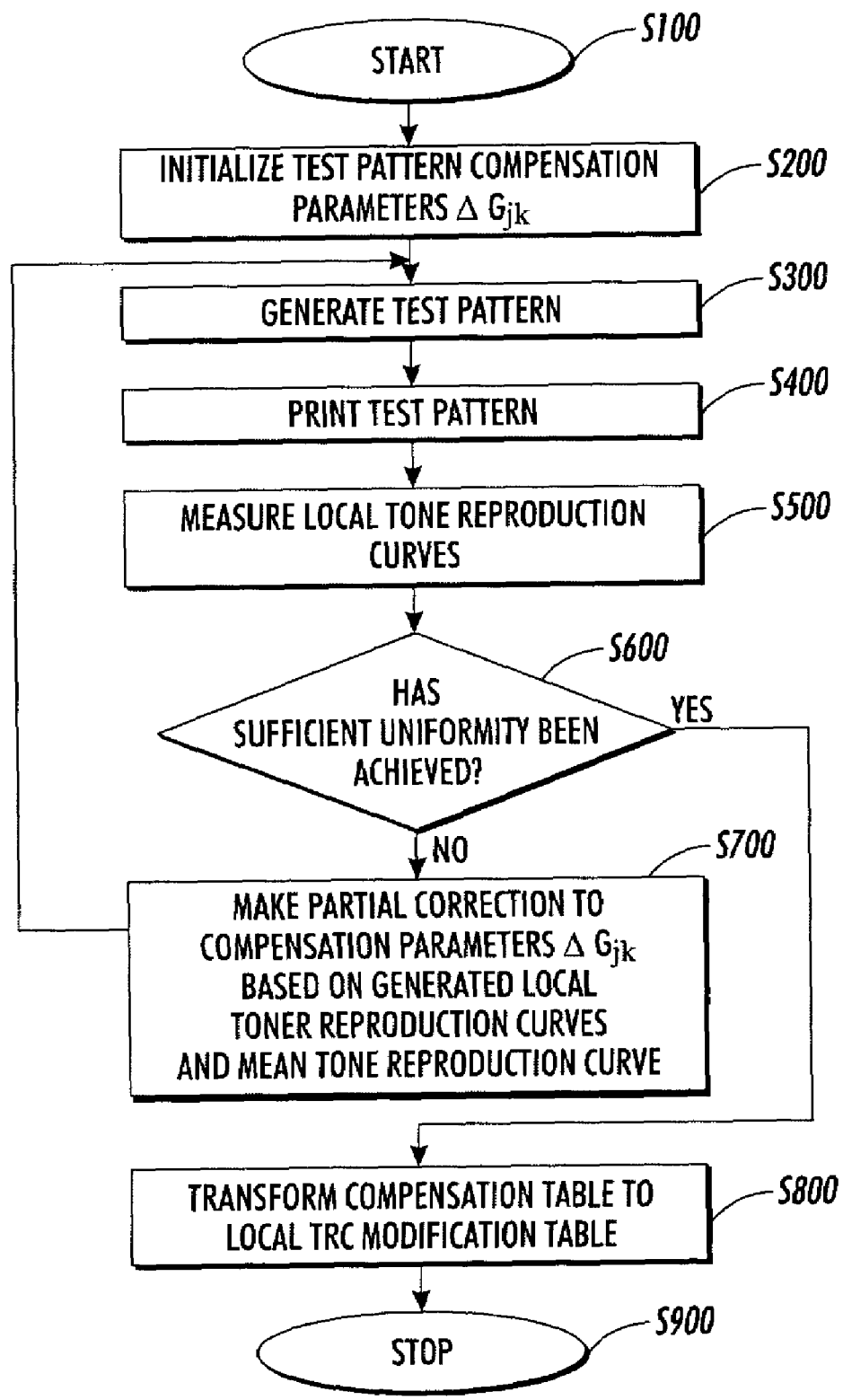
FIG. 6 is a flowchart outlining one exemplary embodiment of a method for generating a set of compensation parameters usable to compensate any image during printing.

FIG. 6 is a flowchart outlining one exemplary embodiment of a method for determining the local TRC compensation parameters according to this invention. In various exemplary embodiments, the compensation parameter is defined as $\Delta G_{ijk}$, where i is the iteration number, j is the pixel column, and k is the gray level. The compensation parameters are initialized by setting $\Delta G_{0jk}=0$ for all values of j and k.

As shown in FIG. 6, operation of the method begins in step S100, and continues to step S200, where the compensation parameters $\Delta G_{1jk}$ are initialized. It should be noted that the initialized compensation parameters $\Delta G_{1jk}$ have no effect on the digital gray image. In other words, the digital gray input values are the same as the digital gray output values. Then, in step S300, a compensation test pattern is generated. In general, a compensation test pattern consistent with the description provided above with respect to FIG. 5 is used. Next, in step S400, the digital test pattern for the $i^{th}$ iteration is halftoned and printed. Operation then continues to step S500.

In step S500, the printed test pattern is scanned and the local tone reproduction curve is measured. Next, in step S600, a determination is made whether sufficient uniformity in the gray level strips of the printed compensation test pattern has been achieved. If not, operation continues to step S700. Otherwise, once sufficient uniformity has been achieved, operation jumps to step S800. It should be appreciated that, in this exemplary embodiment, the gray level strips become more uniform as the compensation procedure proceeds. In various exemplary embodiments, the uniformity of the gray level strips is defined by one or more metrics. In these exemplary embodiments, based on the values of the metrics, the uniformity of the gray level strips is determined to be sufficient or not. Of course, any desired technique can be used to determine whether the uniformity of the gray level stripe is sufficient.

In step S700, the compensation parameters $\Delta G$ are partially updated. The amounts used to update the compensation parameters $\Delta G_{ijk}$ for each pixel column j are determined by comparing the local tone reproduction curves for the pixel columns j to the mean tone reproduction curve. The local tone reproduction curves for the pixel columns is the set of points relating the scanner response $R_{jk}$ for the pixel column j to the gray level input k for the pixel column j. Each point in the mean tone reproduction curve is the scanner response averaged over all the pixel columns j for the corresponding gray level k. In some exemplary embodiments, not all gray levels k are printed in the test pattern. In these exemplary embodiments, an interpolation scheme can be used to infer what the printer response would be for a particular gray level that was not actually printed.

If the actual gray level value for a given gray level k in the pixel column j is lighter or darker than the mean value across the entire strip for that given gray level k, then the compensation parameter ΔG needs to be modified. The local slope of the mean tone reproduction curve is used to estimate how much the digital gray level must be changed, i.e., how much $\Delta D_{ijk}$ the value of $\Delta G_{ijk}$ should be modified by, to bring the local gray level k for the $j^{th}$ pixel column closer to the mean gray level for that given gray level k.

Because of measurement noise, there may be errors in estimating the modification to the value of $\Delta G_{ijk}$. Therefore, in various exemplary embodiments, to make the technique less sensitive to measurement noise, the compensation parameter $\Delta G_{ijk}$ is updated by only a fraction f of the full estimated modification $\Delta D_{ijk}$ needed to achieve uniformity across each of the halftone or gray level stripe. Specifically, for a next iteration (i+1) of steps S300–S600, the updated compensation parameters $\Delta G_{(i+1)jk}$ are:

$$\Delta G_{(i+1)jk} = \Delta G_{ijk} + f^* \Delta D_{ijk},$$

where:

$\Delta G_{(i+1)jk}$ is the set of compensation parameters for the (i+1) iteration of steps S300–S600;

$\Delta G_{ijk}$ is the current set of compensation parameters;

$\Delta D_{ijk}$ is the current difference between the mean gray level value for each gray level or halftone strip k and the actual gray level value for the $j^{th}$ pixel column for the $k^{th}$ gray level or halftone strip; and f is a value between 0.0 and 1.0; i.e., $0.0 < f \leq 1.0$.

It should be appreciated that, in various exemplary embodiments, the current difference $\Delta D_{ijk}$ can be used as the metric for determining if there is sufficient uniformity. In these exemplary embodiments, the values for the $\Delta D_{ijk}$ parameters are initially set to ∞, so that two iterations are always required. Then, after the first iteration of step S700, the $\Delta D_{ijk}$ parameters are set to actual values. A uniformity metric is obtained from the profile of the $\Delta D_{ijk}$ parameters. This metric could be as simple as requiring all $\Delta D_{ijk}$ parameters to be less than some threshold. Alternatively, a more complicated function of the profile that takes into account the human visual response system could be used. If, in step S600, the uniformity metric meets the uniformity criterion, sufficient uniformity has been obtained, and operation jumps to step S800.

In step S800, the compensation parameters $\Delta G_{jk}$ are transformed into a table, or are parameterized as a function, so that the compensation values $\Delta G_{jk}$ can be applied in real time when printing grayscale data using the printer. Then, in step S900, operation of the method ends.

It should be appreciated that, in general, f can be less than 1.0. In these situations, a number of iterations may be necessary to obtain sufficiently uniform printed compensation test patterns. In various other exemplary embodiments, f can be set to 1.0. This effectively limits the number of iterations to one, since the full compensation parameter values are applied to the next printed compensation test pattern, which should result in sufficient uniformity. It should further be appreciated that, in various exemplary embodiments, steps S600 and S700 can be omitted. This also effectively sets f to 1.0. In this iteration, after the compensation parameters $\Delta G_{jk}$ are generated in step S200 and steps S300 and S400 are performed once, operation jumps directly from step S500 to step S800. Accordingly, only a single iteration of steps S300–S500 is performed.

Figure 7:
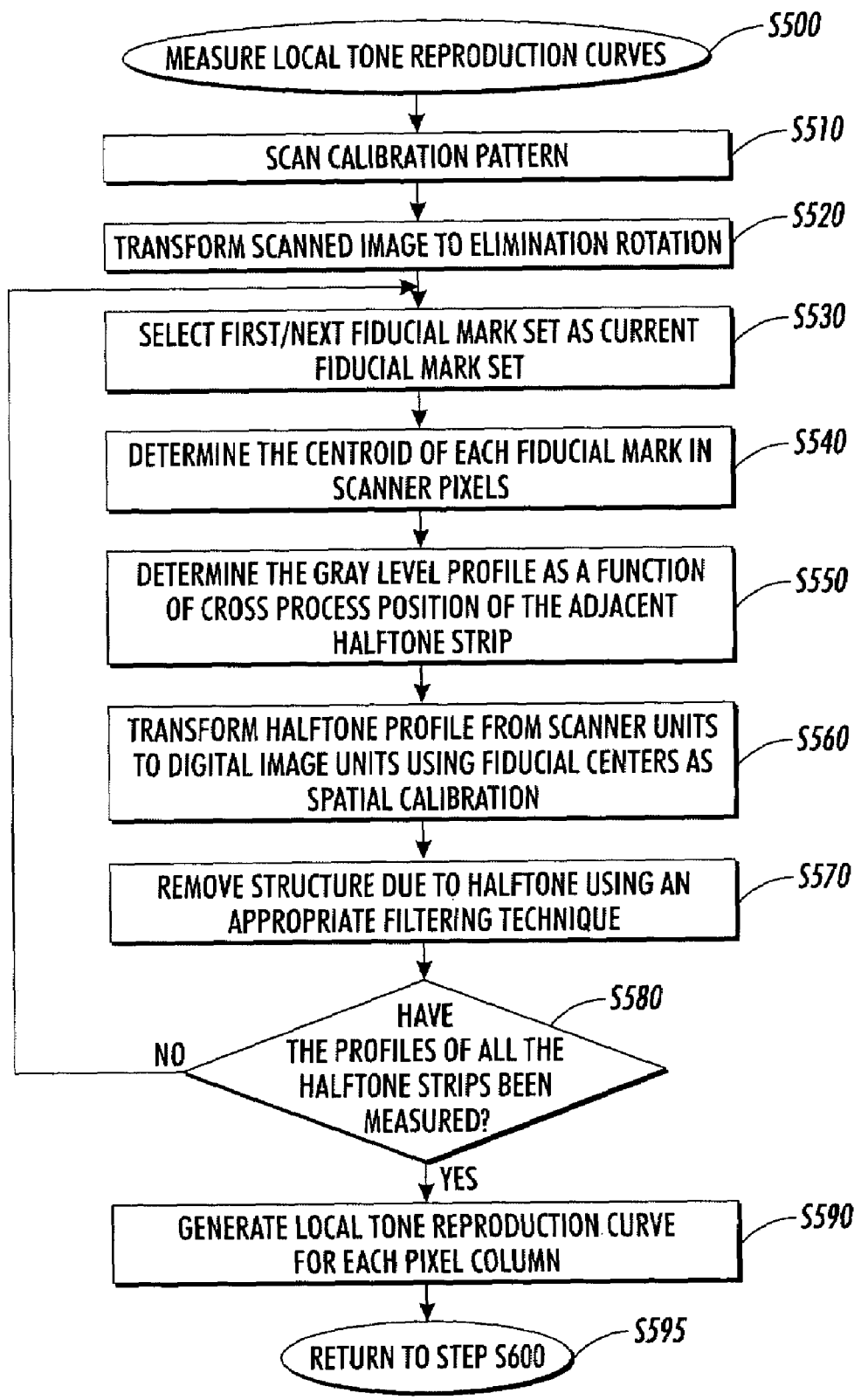
FIG. 7 is a flowchart outlining in greater detail one exemplary embodiment of the method for generating the set of local tone reproduction curves using the test pattern shown in FIG. 5.

FIG. 7 is a flowchart outlining in greater detail one exemplary embodiment of a method for generating a set of local tone reproduction curves according to this invention. As shown in FIG. 7, operation of the method begins in step S500, and continues to step S510, where the printed compensation test pattern is scanned. It should be appreciated that the printed compensation test pattern can be scanned internally within the image forming device or can be scanned using a physically separate scanner. Operation then continues to step S520.

It should be appreciated that the captured image obtained by scanning the printed compensation test pattern may not be perfectly oriented to the scanning axes due to rotation of the paper on the scanner platen and/or rotation of the printed image on the paper. Accordingly, in step S520, any rotation of the image relative to the scanning axes is determined using features of the printed compensation test pattern and/or features of the fiducial marks printed elsewhere on the printed compensation test pattern for this purpose. Any rotation of the image is dealt with by appropriate image processing techniques. Alternatively, the image can be processed based on the measured rotation to identify the features within the image. Operation then continues to step S530.

As shown in FIG. 5, the printed compensation test pattern includes some number of sets of fiducial marks and what should be uniform halftone strips. In step S530, the physical position of a first or next row of fiducial marks is selected as a current fiducial row. This can be performed using any of a number of conventional techniques. One particular robust technique is to scan, line by line, through the captured image to identify those scan lines that give a strong signal at the period of the spacing between the fiducials. From the location of the fiducial row, the position of any adjacent halftone strips can also be identified. Alternatively, the positions of the adjacent halftone strips can be identified using the edge location marks. Operation then continues to step S540.

In step S540, the centroid of each fiducial mark in the current row of fiducial marks is determined. In various exemplary embodiments, the centroid is determined by taking a cross-section through the fiducial marks of the current row of fiducial marks, averaging over the length of those fiducial marks. Then, in step S550, a profile of the halftone strip that follows the current row of fiducial marks, i.e., the current halftone strip or gray level strip, as a function of position in scanner pixel units along the cross-process direction is generated. Next, in step S560, the profile of the current halftone strip or gray level strip is transformed from being defined based on the scanner pixel units to being defined based on digital image pixel units. This transform is performed based on the relationship between the measured centroid positions and the digital image centroid position of the fiducial marks of the current row of fiducial marks. Operation then continues to step S570.

In step S570, the high frequency structure in the profile of the current halftone strip, or gray level strip, due to the halftone screen is removed. The halftone frequency structure can be removed using any of a variety of known techniques. One technique is to use distributed aperture filtering. In this technique, over short segments of the image, the change in gray level as a function of pixel at the halftone period is calculated and subtracted from the profile. Next, in step S580, a determination is made whether all of the halftone or gray level strips have been analyzed. If all of the halftone or gray level strips have been analyzed, operation continues to step S590. Otherwise, if not all the halftone or gray level strips have been analyzed, operation returns to step S530.

In step S590, because a set of $N_p \times N_s$ gray levels have been obtained, where $N_p$ is the number of pixel columns in the printed compensation test pattern and $N_s$ is the number of strips in the printed compensation test pattern, these gray level values are ordered by column to obtain a set of $N_p$ local tone reproduction curves, where the local tone reproduction curve has been sampled at $N_s$ points. It should be appreciated that the methods and systems of the 573 patent, or of any other appropriate local tone reproduction curve generating technique, can be used to generate the local tone reproduction curve for each cross-process-direction image-forming device pixel location based on the average gray levels of the halftone strips for cross-process-direction scanner image pixel column and the determined relationship between the cross-process-direction image-forming device pixel locations and the cross-process-direction scanner image pixel columns. Operation then continues to step S595, where operation returns to step S600.

As outlined above with respect to FIG. 5, some pairs of adjacent compensation strips may not have intervening intermediate sets of fiducial marks. Likewise, the first or last sets of fiducial marks may be omitted. In some such exemplary embodiments, one or more sets of fiducial marks may be associated with two or more compensation strips. In such exemplary embodiments, after a first or next set of fiducial marks is selected in step S530, before steps S540–S550 are performed, if the selected set of fiducial marks has two or more compensation strips associated with that selected set of fiducial marks, one of those associated compensation strips is selected as the current compensation strip. Steps S540–S570 are then performed for that current compensation strip. Then, before step S580 is performed, each other compensation strip associated with the selected set of fiducial marks is selected in turn and steps S540–S570 repeated for that compensation strip.

Figure 8:
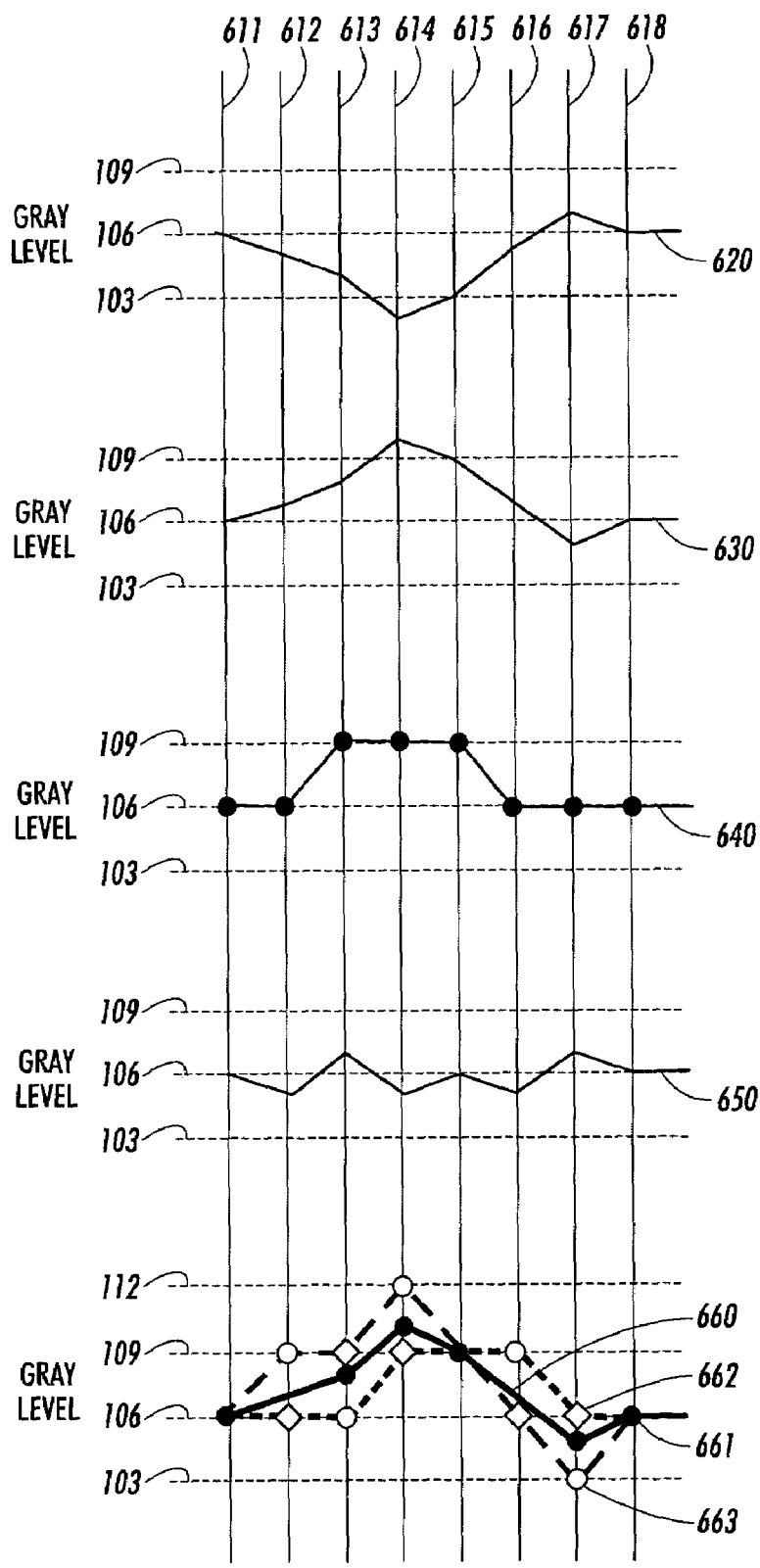
FIG. 8 is a graph illustrating one exemplary embodiment of a method for compensating for the effect of low-halftone-intensity resolution when compensating for streak defects.

FIG. 8 is a graph illustrating one exemplary embodiment of the method for compensating for the effects of coarse halftone gray level resolution on the streak defect compensation described above. The curves 620–650 shown in FIG. 10 demonstrate how the halftone intensity resolution affects the streak defect compensation results. The curve 660 demonstrates one exemplary method for compensating for low halftone intensity resolution.

The actual printed toner density curve 620 generated from a constant gray level value of 106 is shown in FIG. 8 as a function of the pixel column 611–618. The pixel columns 612–617 show printed densities higher and lower than the input value of 106, indicating streak defects. The compensated input gray level curve 630 shows the gray level input values needed to generate a constant printed toner density of 106 and is also a function of the pixel column 611–618.

In the image forming system used in the example shown in FIG. 8, the halftone design only supports gray levels of 103, 106 and 109 near the input gray levels of the compensated input gray level curve 630. When the compensated input gray level curve 630 is sampled for the halftone process, as shown in the compensated halftone density curve 640, the compensated input digital gray level curve 630 is rounded to the levels of 106 and 109. When the compensated halftone density curve 640 is printed, the compensations do not match the streak defects and residual streak defects are seen in the compensated printed toner density curve 650.

One exemplary embodiment of a method to compensate for the effects of the limited halftone resolution on the streak defect compensation described above is to dither the halftone value in a pixel column between the two available resolution values nearest to the desired value in the compensated input digital gray level curve 630. For example, in the dithered halftone density curve 660, the 66% resolution value 662 (shown with a gray dot in column 617) indicates that the resolution value of 106 is used for two out of every three pixels. Similarly, the 33% resolution value 663 (shown with a white dot in column 617) indicates that the resolution value of 103 is used for the other one out of every three pixels. As a result, the average input intensity value for the pixel column 617 is 105. When the method shown in FIG. 8 is used, the average printed toner intensity column 617 is 106, reducing the visible effect of the remaining streak defect due to the halftone resolution.

Figure 9:
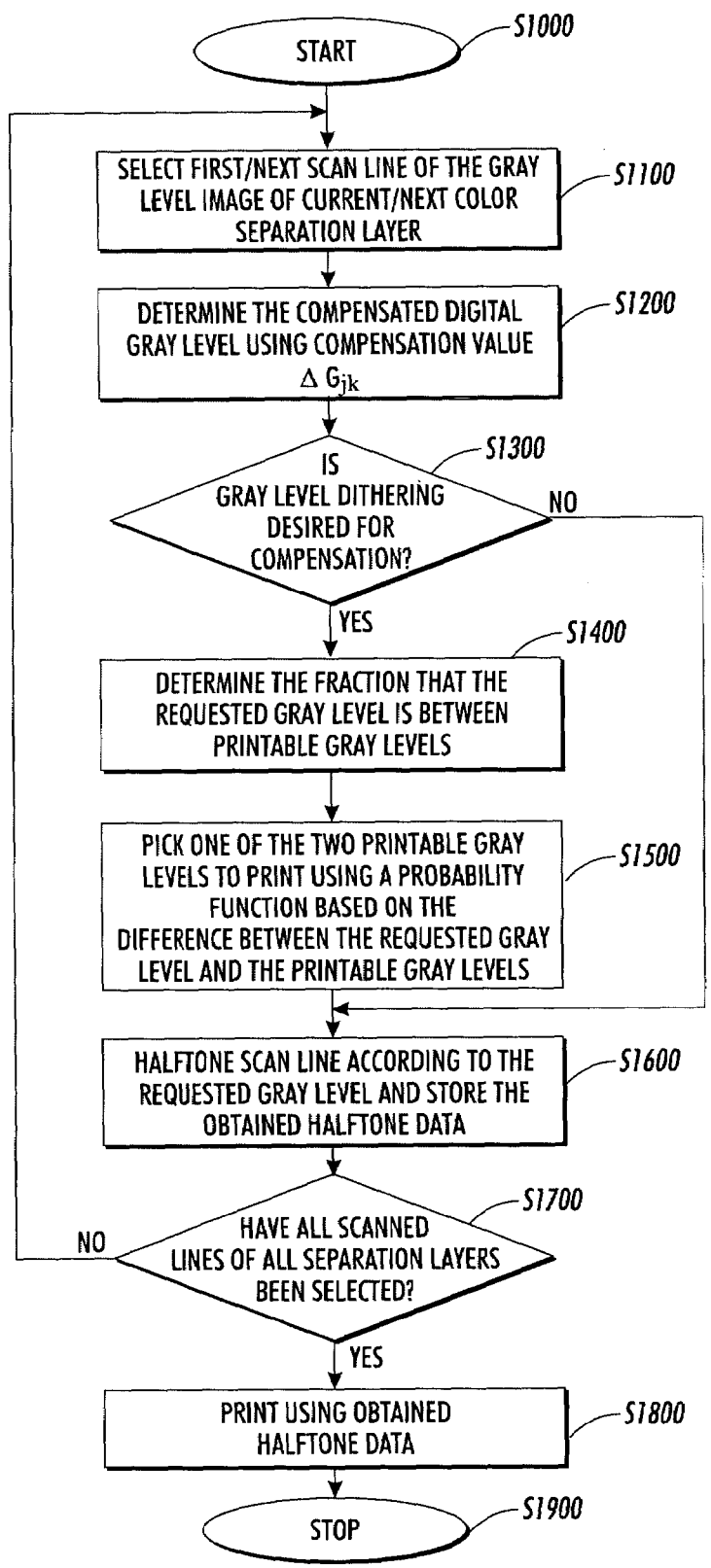
FIG. 9 is a flowchart outlining one exemplary embodiment of a method for applying the compensation parameters when printing an image according to this invention.

FIG. 9 is a flowchart outlining one exemplary embodiment of a method for printing an image using the compensation parameters to compensate for streak defects. As shown in FIG. 9, operation of the method begins in step S1000, and continues to step 1100, where a first or next scan line for a first or next single color separation layer is selected. The selected scan line comprises image intensity values for each printer pixel location along the cross-process direction. Then, in step S1200, the image intensity level for each cross-process direction pixel location is adjusted using the determined $\Delta G_{jk}$ compensation parameter values. It should be appreciated that, in various exemplary embodiments, the determined $\Delta G_{jk}$ compensation parameter values are stored in a table. In other exemplary embodiments, the determined $\Delta G_{jk}$ compensation parameters are parameterized into an operation that inputs the original image intensity value and cross-process direction pixel location and outputs the compensated image intensity value for that cross-process direction pixel location. Operation then continues to step S1300.

In step S1300, a determination is made whether dithering is desired to obtain the desired gray level resolution to compensate for the streak defect. It should be appreciated that this determination is based on the number of independent gray levels for the halftone being printed and the image quality requirements of the printer. If dithering is desired, operation proceeds to step S 1400. Otherwise, operation jumps directly to step S1600. In step S1400, for each pixel column, the location of the requested gray level between the higher printable gray level and the lower printable gray level is determined. Next, in step S1500, for each pixel column, the compensated image intensity value is modified to either the higher or lower printable gray level at a probability proportional to the difference between the requested gray level and the higher and lower printable gray levels. Operation then continues to step S1600.

In step S1600, the selected scanline is halftoned and the halftone data is stored. Then, in step S1700, a determination is made whether all scanlines for all color separation layers have been selected. If not, operation returns to step S1100, where a next scanline of the current color separation layer or a first scanline of a next color separation layer is selected. Otherwise, operation continues to step S1800, where the stored halftone data is printed. Operation then continues to step S1900, where operation of the method ends. It should be appreciated that, in some exemplary embodiments, in step S1600, the halftone data is not stored, but is immediately output to the printer for printing while the next scanline is being analyzed.

Figure 10:
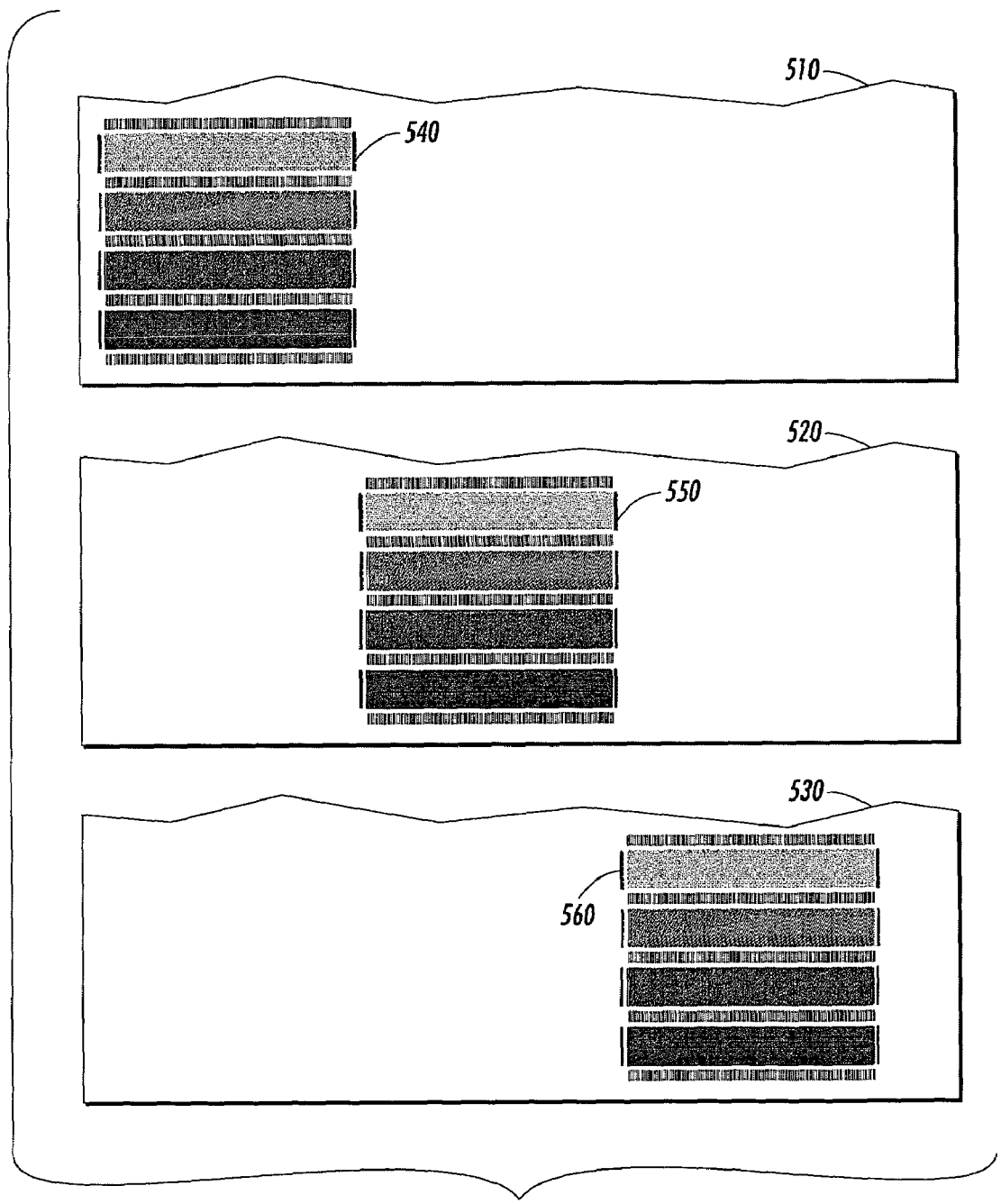
FIG. 10 graphically illustrates how the compensation pattern shown in FIG. 5 is used to calibrate the entire width of the printer when the width of the pattern is limited due to processing capacity.

FIG. 10 graphically illustrates one exemplary embodiment of a method to use the compensation pattern shown in FIG. 5 to calibrate the entire width of the image forming device when the width of the pattern is limited due to processing capacity. As shown in FIG. 10, the width of the patterns 540, 550 and 560 is narrowed to reduce the number of pixel columns that must be processed when a compensation pattern page 510, 520 and 530 is scanned. It should be appreciated that the pattern width may be as wide as processor capacity makes feasible. Successive compensation sheets 510, 520 and 530 are printed and scanned, with compensation patterns 540, 550 and 560 in different locations are used to calibrate the entire cross-process range of the image forming device.

Figure 11:
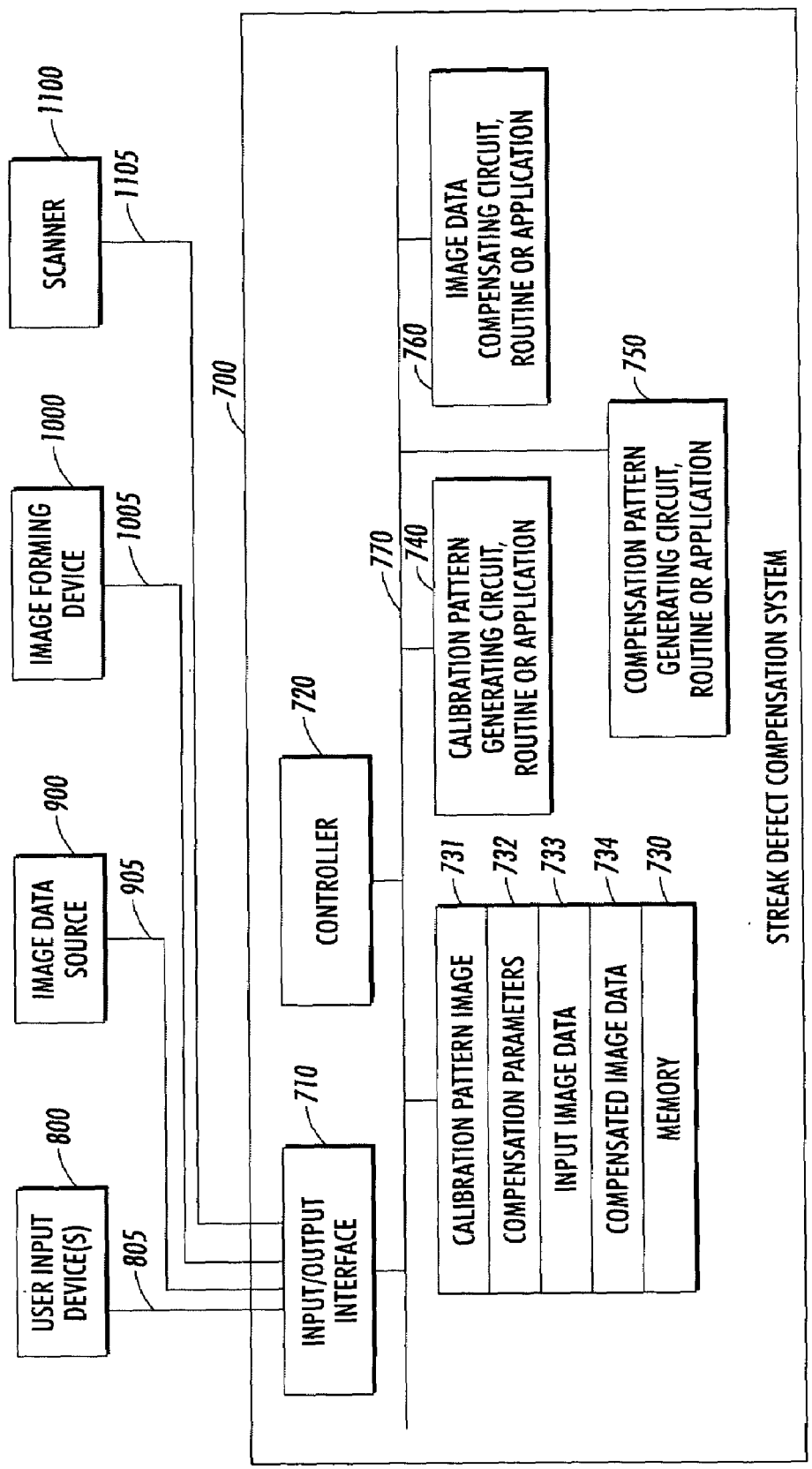
FIG. 11 is a block diagram of one exemplary embodiment of a streak defect compensation system according to this invention.

FIG. 11 shows one exemplary embodiment of a streak defect compensation system 700 according to this invention. As shown in FIG. 11, the streak defect compensation system 700 includes an input/output interface 710, a controller 720, a memory 730, a compensation pattern generating circuit, routine or application 740, a compensation parameter generating circuit, routine or application 750, and an image data compensation circuit, routine or application 760, interconnected by one or more control and/or data busses and/or application programming interfaces 770.

As shown in FIG. 11, one or more user input device(s) 800, a image data source 900, an image forming device 1000, and a scanner 1100 are connected to the streak defect compensation system 700 by links 805, 905, 1005 and 1105 respectively.

In general, the image data source 900 shown in FIG. 11 can be any known or later-developed device that is capable of providing image data to the streak defect compensation system 700. In general, the image forming device 1000 shown in FIG. 11, can be any known or later-developed device that is capable of printing image data and is susceptible to streak defects that can be compensated for using the streak defect compensation system 700. In general, the scanner shown in FIG. 11 can be any known or later-developed device that is capable of imaging hardcopy material to produce image data from that hardcopy material that can then be input into the streak defect compensation system 700.

The image data source 900, the image forming device 1000, and/or the scanner 1100 can be integrated with the streak print defect correction system 700, such as in a general-purpose digital copier. In addition, the streak defect compensation system 700 may be integrated with devices providing additional functions in addition to the image data source 900, the image forming device 1000, and/or the scanner 1100, in a larger system that performs all functions, such as a multi-function printer/scanner/copier/fax.

Each of the respective one or more user input device(s) 800 may be one or any combination of multiple input devices, such as a keyboard, a mouse, a joy stick, a trackball, a touch pad, a touch screen, a pen-based system, a microphone and associated voice recognition software, or any other known or later-developed device for inputting data and/or user commands to the streak print defect correction system 700. It should be understood that the one or more user input device(s) 800, of FIG. 11 do not need to be the same type of device.

Each of the links 805, 905, 1005 and 1105 connecting the user input device(s) 800, the image data source 900, and the image forming device 1000 to the streak print defect correction system 700 can be a direct cable connection, a modem, a local area network, a wide area network, and intranet, the Internet, any other distributed processing network, or any other known or later developed connection device. It should be appreciated that either of these links 805, 905, 1005 and 1105 may include wired or wireless portions. In general, each of the links 805, 905, 1005 and 1105 can be implemented using any known or later-developed connection system or structure usable to connect the respective devices to the streak print defect correction system 700. It should be understood that the links 805, 905, 1005 and 1105 do not need to be of the same type.

As shown in FIG. 11, the memory 730 can be implemented using any appropriate combination of alterable, volatile, or non-volatile memory or non-alterable, or fixed memory. The alterable memory, whether volatile or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps an optical ROM disk, such as a CD-ROM or DVD-ROM disk and disk drive or the like.

Each of the various embodiments of the streak defect compensation system 700 can be implemented as software executing on a programmed general purpose computer, a special purpose computer, a microprocessor or the like. It should also be understood that each of the circuits, routines, applications, objects or managers shown in FIG. 11 can be implemented as portions of a suitably programmed general-purpose computer. Alternatively, each of the circuits, routines, applications, objects or managers shown in FIG. 11 can be implemented as physically distinct hardware circuits within an ASIC, using a digital signal processor (DSP), using a FPGA, a PLD, a PLA and/or a PAL, or using discrete logic elements or discrete circuit elements. The particular form of the circuits, routines, applications, objects or managers shown in FIG. 11 will take is a design choice and will be obvious and predictable to those skilled in the art. It should be appreciated that the circuits, routines, applications, objects or managers shown in FIG. 11 do not need to be of the same design.

When operating the streak defect compensation system 700, a compensation request can be input from one of the user input device(s) 800 over the link 805 or from the image forming device 1000 over the link 1005 shown in FIG. 11. The input/output interface 710 inputs the compensation or update compensation parameters request, and under the control of the controller 720, forwards it to the compensation pattern generating circuit, routine or application 740.

The compensation pattern generating circuit, routine or application 740 then retrieves the compensation pattern image from the compensation pattern image portion 731 of the memory 730 under control of the controller 720. The compensation pattern generating circuit, routine or application 740 then outputs the compensation pattern image, under the control of the controller 720, to the image forming device 1000 through the input/output interface 710 and over the link 1005. In various exemplary embodiments that iteratively modify the printed compensation test pattern, the compensation pattern generating circuit, routine or application 740 may apply the compensation parameters $\Delta G_{jk}$ determined in a previous iteration to the compensation test pattern before outputting the compensation test pattern to the image forming device 1000.

The scanned image of the printed compensation pattern is then input from the scanner 1100 over the link 1105. The input/output interface 710 inputs the scanned image of the printed compensation pattern, and, under the control of the controller 720, forwards the scanned image data to the compensation parameter generating circuit, routine or application 750. The compensation parameter generating circuit, routine or application 750 then determines the compensation parameters to be used in the streak correction process, in the form of local tone reproduction curves, and/or in the form of gray level offset look-up tables, as described above. The compensation parameter generating circuit, routine or application 750 then, under the control of the controller 720, stores the compensation parameters in the compensation parameters portion 732 of the memory 730. It should be appreciated that, in various exemplary embodiments that iteratively determine the compensation parameters $\Delta G_{jk}$, the compensation parameter generating circuit, routine or application 750 also determines if sufficient uniformity in the halftone strips has been obtained. If not, the compensation parameter generating circuit, routine or application 750 causes, under control of the controller, the compensation pattern generating circuit, routine or application 740 to generate and print another compensation test pattern.

When operating the streak defect compensation system 700, a print input image request can be input from one of the user input device(s) 800 over the link 805 or from the image forming device 1000 over the link 1005. The input/output interface 710 inputs the print input image request, and under the control of the controller 720, forwards it to the image data compensation circuit, routine or application 760.

The image data compensation circuit, routine or application 760 then either retrieves the compensation parameters from the compensation parameters portion 732 of the memory 730 or receives compensation parameters directly from the compensation parameter generating circuit, routine or application 750 under control of the controller 720. The image data compensation circuit, routine or application 760 then, under control of the controller 720, either retrieves the input image data from the input image data portion 733 of the memory 730, and/or receives the input image data directly from the image data source 900 over the link 905.

The image data compensation circuit, routine or application 760 then modifies the image data to compensate for the streak defects as described above. Under the control of the controller 710, the compensated image data is then stored in the compensated image portion 734 of the memory 730 or is output directly to the image forming device 1000 over the link 1005.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications, variations, improvements, and/or substantial equivalents.

What is claimed is:

1. A method for compensating for streak defects in an image formed using an image forming device that forms the image on a receiving material that is translated through the image forming device along a process direction, comprising:
    printing a compensation pattern usable to determine a difference in gray level between an actual gray level value and an intended gray level value at a cross-process-direction image-forming device pixel location in the image, comprising:
        printing a plurality of gray level portions, each gray level portion having a gray level that is different from the other gray level portions and extending along the cross-process-direction, the plurality of gray level portions arranged along the process direction, and spaced from each other along the process direction such that a gap is provided between each pair of adjacent gray level portions,
        printing a number of rows of fiducial marks, the rows of fiducial marks distributed among the plurality of gray level portions and comprising at least some of:
            a first row of fiducial marks located before the plurality of gray level portions along the process direction,
            a second row of fiducial marks located after the plurality of gray level portions along the process direction, and
            at least one third row of fiducial marks, each third row of fiducial marks located in a gap between a pair of adjacent gray level portions;
    scanning the compensation pattern to generate a set of scanned image data, the scanned image data defining an image value for each of a plurality of scanned image cross-process-direction pixel locations for at least one of the gray level portions and for at least one row of fiducial marks;
    analyzing the scanned image data for at least one of the gray level portions to determine at least one actual gray level value for at least one of the plurality of gray level portions for at least one cross-process-direction image-forming device pixel location based on a location of at least one fiducial mark of the at least one row of fiducial marks in the scanned image data;
    generating, for each analyzed cross-process-direction image-forming device pixel location, for each analyzed gray level portion of that analyzed cross-process-direction image-forming device pixel location, at least one compensation parameter based on the determined actual gray level value for that analyzed gray level portion and the intended gray level value for that analyzed gray level portion.

2. The method of claim 1, wherein:
    for each fiducial mark of the first row of fiducial marks, that fiducial mark is associated with at least one particular cross-process-direction image-forming device pixel location;
    for each fiducial mark of the second row of fiducial marks, that fiducial mark is associated with at least one particular cross-process-direction image-forming device pixel location and corresponds with the fiducial mark of first row of fiducial marks that is associated with that at least one particular cross-process-direction image-forming device pixel location; and
    for each third row of fiducial marks, for each fiducial mark of that third row of fiducial marks, that fiducial mark is associated with at least one particular cross-process-direction image-forming device pixel location and corresponds with the fiducial mark of first and second rows of fiducial marks that is associated with that at least one particular cross-process-direction image-forming device pixel location.

3. The method of claim 1, wherein analyzing the scanned image data based on the scanned image cross-process-direction pixel location of at least one fiducial mark of the at least one row of fiducial marks to determine at least one actual gray level value for at least one of the plurality of gray level portions for at least one cross-process-direction image-forming device pixel location comprises:
    selecting one of the scanned image pixel locations as a current scanned image cross-process-direction pixel location;
    selecting one of the plurality of gray level portions as a current gray level portion;
    selecting, based on the current gray level portion, at least one of the number of rows of fiducial marks;

determining, based on the current scanned image cross-process-direction pixel location, at least one fiducial mark in at least one of the at least one selected row of fiducial marks that is associated with the current scanned image pixel location;

determining, for each of the determined fiducial marks associated with the current scanned image cross-process-direction pixel location, a centroid of that fiducial mark;

determining, for the cross-process-direction image-forming device pixel location associated the selected scanned image pixel location, the actual gray level value for the selected gray level portion of the associated cross-process-direction image-forming device pixel location based on the determined centroids of the associated fiducial marks.

4. The method of claim 3, wherein analyzing the scanned image data further comprises repeating the gray level selecting, the at least one row of fiducial marks selecting, the at least one mark determining, the centroid determining and the actual gray level determining steps for each of the plurality of gray level portions.

5. The method of claim 4, wherein analyzing the scanned image data further comprises repeating the scanned image cross-process-direction pixel location selecting step.

6. The method of claim 3, wherein analyzing the scanned image data further comprises repeating the scanned image cross-process-direction pixel location selecting step.

7. The method of claim 3, further comprising:
determining, for that fiducial mark, an average gray level value for each scanner pixel location along the cross-process direction associated with that fiducial mark;
developing an intensity vs. cross-process position curve; and
identifying each side of that fiducial mark along the cross-process direction based on the intensity vs. cross-process position curve and a determined threshold value;
wherein determining, for each of the determined fiducial marks that are associated with the current scanned image pixel location, a centroid of that alignment mark comprises:
determining a maximum value on the intensity vs. cross-process position curve for that fiducial mark as the centroid of that fiducial mark.

8. The method of claim 7, where determining, for the cross-process-direction image-forming device pixel location associated with the selected scanned image cross-process-direction pixel location, the actual gray level value for the selected gray level portion of the associated cross-process-direction image-forming device pixel location based on the determined centroids of the first and second associated fiducial marks comprises determining the cross-position process-direction image-forming device pixel location that is associated with the selected scanned image cross-process-direction pixel location based on the locations of the determined centroid of the at least one determined fiducial mark.

9. The method of claim 8, where determining, for the cross-process-direction image-forming device pixel location associated with the selected scanned image cross-process-direction pixel location, the actual gray level value for the selected gray level portion of the associated cross-process-direction image-forming device pixel location based on the determined centroid of the at least one determined fiducial mark comprises:
identifying, based on the at least one determined fiducial mark, the scanned image data pixels of the selected gray level portion associated with the selected scanned image cross-process-direction pixel location; and
averaging the gray level values of the identified scanned image data pixels to generate the actual gray level value for the selected gray level portion for the selected scanned image cross-process-direction pixel location.

10. The method of claim 1, wherein generating the compensation parameter for each analyzed cross-process-direction image-forming device pixel location and for each analyzed gray level portion of that analyzed cross-process-direction image-forming device pixel location comprises generating a local tone reproduction curve value for that analyzed gray level value and for that analyzed cross-process-direction image-forming device pixel location that is usable in place of a generalized tone reproduction curve value for the image device, to convert input image data into printable image data such that the actual gray level value that is printed for that cross-process-direction image-forming device pixel location is substantially equivalent to the intended gray level value.

11. The method of claim 10, further comprising generating a local tone reproduction curve that provides a compensation parameter for each possible intended gray level value for that analyzed cross-process-direction image-forming device pixel location.

12. The method of claim 11, wherein generating a local tone reproduction curve comprises determining compensation parameters for each possible intended gray level value based on the determined compensation parameters for the plurality of actual gray level portions.

13. The method of claim 12, wherein determining compensation parameters for each possible intended gray level value comprises interpolating between the determined compensation parameters for the plurality of actual gray level portions for intended gray level values that lie between the gray level values of adjacent ones of the plurality of actual gray level portions.

14. The method of claim 1, further comprising:
printing a modified ideal compensation pattern using an ideal tone reproduction curve and a set of modifications $\Delta G_{ijk}$;
scanning the modified ideal compensation pattern;
selecting one of the plurality of gray level portions of the scanned modified ideal compensation pattern as a current gray level portion;
determining an average gray level value of the current gray level portion;
repeating the scanning, selecting and determining steps for each other gray level portion; and
generating a new ideal tone reproduction curve based on the determined average gray levels of the plurality of gray level portions.

15. The method of claim 14, wherein analyzing the scanned image data for at least one of the gray level portions to determine at least one actual gray level value for at least one of the plurality of gray level portions for at least one cross-process-direction image-forming device pixel location based on a location of at least one fiducial mark of at least one row of fiducial marks in the scanned image data comprises:
selecting one of the scanned image cross-process-direction pixel locations as a current scanned image cross-process-direction pixel location;
selecting one of the plurality of gray level portions as a current gray level portion;
selecting, based on the current gray level portion, at least one of the number of rows of fiducial marks;

determining, based on the current scanned image cross-process-direction pixel location, at least one fiducial mark in at least one of the at least one selected row of fiducial marks that is associated with the current scanned image cross-process-direction pixel location;

determining, for each of the determined fiducial marks associated with the current scanned image cross-process-direction pixel location, a centroid of that fiducial mark;

determining, for the cross-process-direction image-forming device pixel location associated with the selected scanned image cross-process-direction pixel location, the actual gray level value for the selected gray level portion of the associated cross-process-direction image-forming device pixel location based on the determined centroids of the associated fiducial marks.

16. The method of claim 15, wherein analyzing the scanned image data further comprises repeating the gray level selecting, the at least one row of fiducial marks selecting, the at least one mark determining, the centroid determining and the actual gray level determining steps for each of the plurality of gray level portions.

17. The method of claim 16, wherein analyzing the scanned image data further comprises repeating the scanned image cross-process-direction pixel location selecting step.

18. The method of claim 17, wherein generating the compensation parameter for each analyzed cross-process-direction image-forming device pixel location and for each analyzed gray level portion of that analyzed cross-process-direction image-forming device pixel location comprises generating a local tone reproduction curve value for that analyzed gray level value and for that analyzed cross-process-direction image-forming device pixel location that is usable in place of a generalized tone reproduction curve value for the image device, to convert input image data into printable image data such that the actual gray level value that is printed for that cross-process-direction image-forming device pixel location is substantially equivalent to the intended gray level value.

19. The method of claim 18, further comprising determining streak defect magnitudes $D_{ijk}$ for a current iteration i, for each cross-process-direction image-forming device pixel location j and for each input gray level value k.

20. The method of claim 19, further comprising:
determining if all determined $D_{ijk}$ are less than a determined value E; and
if not, determining a new set of modifications $\Delta G_{ijk}$.

21. A storage medium storing a set of program instructions executable on a data processing device and usable to create data for compensating for streak defects in an image formed using an image forming device that forms the image on a receiving material that is translated through the image forming device along a process direction, the set of program instructions comprising:

instructions for printing a compensation pattern usable to determine a difference in gray level between an actual gray level value and an intended gray level value at a cross-process-direction image-forming device pixel location in the image, comprising:

instructions for printing a plurality of gray level portions, each gray level portion having a gray level that is different from the other gray level portions and extending along the cross-process-direction, the plurality of gray level portions arranged along the process direction, and spaced from each other along the process direction such that a gap is provided between each pair of adjacent gray level portions, instructions for printing, for each gray level portion, a first edge locating mark located adjacent to a first end of that gray level portion and a second edge locating mark located adjacent to a second end of that gray level portion;

instructions for printing a first row of fiducial marks before the plurality of gray level portions along the process direction, instructions for printing a second row of fiducial marks after the plurality of gray level portions along the process direction, and instructions for printing a plurality of third rows of fiducial marks, one third row of fiducial marks located in each gap between a pair of adjacent gray level portions;

instructions for scanning the compensation pattern to generate a set of scanned image data, the scanned image data defining an image value for each of a plurality of scanned image pixel locations;

instructions for analyzing the scanned image data for at least one of the gray level portions to determine at least one actual gray level value for at least one of the plurality of gray level portions for at least one cross-process-direction image-forming device pixel location based on a location of at least one fiducial mark of at least one row of the first row, the second row and the plurality of the third row of fiducial marks in the scanned image data;

instructions for generating, for each analyzed cross-process-direction image-forming device pixel location, for each analyzed gray level portion of that analyzed cross-process-direction image-forming device pixel location, at least one compensation parameter based on the determined actual gray level value for that analyzed gray level portion and the intended gray level value for that analyzed gray level portion.

22. The storage medium of claim 21, wherein:
for each fiducial mark of the first row of fiducial marks, that fiducial mark is associated with at least one particular cross-process-direction image-forming device pixel location;
for each fiducial mark of the second row of fiducial marks, that fiducial mark is associated with at least one particular cross-process-direction image-forming device pixel location and corresponds with the fiducial mark of first row of fiducial marks that is associated with that at least one particular cross-process-direction image-forming device pixel location; and
for each third row of fiducial marks, for each fiducial mark of that third row of fiducial marks, that fiducial mark is associated with at least one particular cross-process-direction image-forming device pixel location and corresponds with the fiducial mark of first and second rows of fiducial marks that is associated with that at least one particular cross-process-direction image-forming device pixel location.

23. The storage medium of claim 21, wherein the instructions for analyzing the scanned image data for at least one of the gray level portions to determine at least one actual gray level value for at least one of the plurality of gray level portions for at least one cross-process-direction image-forming device pixel location based on a location of at least one fiducial mark of at least one of the number of rows of fiducial marks in the scanned image data comprise:

instructions for selecting one of the scanned image cross-process-direction pixel locations as a current scanned image pixel location;

instructions for selecting one of the plurality of gray level portions as a current gray level portion;

instructions for selecting, based on the current gray level portion, at least one of the number of rows of fiducial marks;

instructions for determining, based on the current scanned image cross-process-direction pixel location, at least one fiducial mark in at least one of the at least one selected row of fiducial marks that is associated with the current scanned image cross-process-direction pixel location;

instructions for determining, for each of the determined fiducial marks associated with the current scanned image cross-process-direction pixel location, a centroid of that fiducial mark;

instructions for determining, for the cross-process-direction image-forming device pixel location associated the selected scanned image cross-process-direction pixel location, the actual gray level value for the selected gray level portion of the associated cross-process-direction image-forming device pixel location based on the determined centroids of the associated fiducial marks.

24. The storage medium of claim 23, wherein the instructions for analyzing the scanned image data further comprise instructions for repeating the gray level selecting instructions, the at least one row of fiducial marks selecting instructions, the at least one mark determining instructions, the centroid determining instructions and the actual gray level determining instructions for each of the plurality of gray level portions.

25. The storage medium of claim 24, wherein the instructions for analyzing the scanned image data further comprise instructions for repeating the scanned image pixel location selecting instructions.

26. The storage medium of claim 23, wherein the instructions for analyzing the scanned image data further comprise instructions for repeating the scanned image pixel location selecting instructions.

27. The storage medium of claim 23, further comprising:
instructions for determining, for that fiducial mark, an average gray level value for each scanner pixel location along the cross-process direction;
instructions for developing an intensity vs. cross-process position curve; and
instructions for identifying each side of that fiducial mark along the cross-process direction based on the intensity vs. cross-process position curve and a determined threshold value;
wherein the instructions for determining, for each of the determined fiducial marks that are associated with the current scanned image pixel location, a centroid of that alignment mark comprise:
instructions for determining a maximum value on the intensity vs. cross-process position curve for that fiducial mark as the centroid of that fiducial mark.

28. The storage medium of claim 27, wherein the instructions for determining, for the cross-process-direction image-forming device pixel location associated with the selected scanned image cross-process-direction pixel location, the actual gray level value for the selected gray level portion of the associated cross-process-direction image-forming device pixel location based on the determined centroids of the first and second associated alignment marks comprise instructions for determining the cross-position process-direction image-forming device pixel location that is associated with the selected scanned image cross-process-direction pixel location based on the locations of the determined centroid of the at least one determined fiducial mark.

29. The storage medium of claim 28, wherein the instructions for determining, for the cross-process-direction image-forming device pixel location associated with the selected scanned image cross-process-direction pixel location, the actual gray level value for the selected gray level portion of the associated cross-process-direction image-forming device pixel location based on the determined centroid of the at least one determined fiducial mark comprise:
instructions for identifying, based on the at least one determined fiducial mark, the scanned image data pixels of the selected gray level portion; and
instructions for averaging the gray level values of the identified scanned image data pixels to generate the actual gray level value for the selected gray level portion.

30. The storage medium of claim 21, wherein the instructions for generating the compensation parameter for each analyzed cross-process-direction image-forming device pixel location and for each analyzed gray level portion of that analyzed cross-process-direction image-forming device pixel location comprise instructions for generating a local tone reproduction curve value for that analyzed gray level value and for that analyzed cross-process-direction image-forming device pixel location that is usable in place of a generalized tone reproduction curve value for the image device, to convert input image data into printable image data such that the actual gray level value that is printed for that cross-process-direction image-forming device pixel location is substantially equivalent to the intended gray level value.

31. The storage medium of claim 30, further comprising instructions for generating a local tone reproduction curve that provides a compensation parameter for each possible intended gray level value for that analyzed cross-process-direction image-forming device pixel location.

32. The storage medium of claim 31, wherein the instructions for generating a local tone reproduction curve comprise instructions for determining compensation parameters for each possible intended gray level value based on the determined compensation parameters for the plurality of actual gray level portions.

33. The storage medium of claim 32, wherein the instructions for determining compensation parameters for each possible intended gray level value comprise instructions for interpolating between the determined compensation parameters for the plurality of actual gray level portions for intended gray level values that lie between the gray level values of adjacent ones of the plurality of actual gray level portions.

34. The storage medium of claim 21, further comprising:
instructions for printing a modified ideal compensation pattern using an ideal tone reproduction curve and a set of modifications $\Delta G_{ijk}$;
instructions for scanning the modified ideal compensation pattern;
instructions for selecting one of the plurality of gray level portions of the scanned modified ideal compensation pattern as a current gray level portion;
instructions for determining an average gray level value of the current gray level portion;
instructions for repeating the scanning, selecting and determining instructions for each other gray level portion; and
instructions for generating a new ideal tone reproduction curve based on the determined average gray levels of the plurality of gray level portions.

35. The storage medium of claim 34, wherein the instructions for analyzing the scanned image data for at least one of the gray level portions to determine at least one actual gray level value for at least one of the plurality of gray level portions for at least one cross-process-direction image-forming device pixel location based on a location of at least one fiducial mark of at least one selected row of fiducial marks in the scanned image data comprise:
  instructions for selecting one of the scanned image pixel cross-process-direction locations as a current scanned image cross-process-direction pixel location;
  instructions for selecting one of the plurality of gray level portions as a current gray level portion;
  instructions for determining, based on the current gray level portion, at least one of the number of rows of fiducial marks;
  instructions for determining, based on the current scanned image cross-process-direction pixel location, at least one fiducial mark in at least one of the at least one selected row of fiducial marks that is associated with the current scanned image cross-process-direction pixel location;
  instructions for determining, for each of the determined fiducial marks associated with the current scanned image cross-process-direction pixel location, a centroid of that fiducial mark;
  instructions for determining, for the cross-process-direction image-forming device pixel location associated with the selected scanned image cross-process-direction pixel location, the actual gray level value for the selected gray level portion of the associated cross-process-direction image-forming device pixel location based on the determined centroids of the associated fiducial marks.

36. The storage medium of claim 35, wherein the instructions for analyzing the scanned image data further comprise instructions for repeating the gray level selecting, the at least one selected row of fiducial marks selecting, the at least one mark determining, the centroid determining and the actual gray level determining instructions for each of the plurality of gray level portions.

37. The storage medium of claim 36, wherein the instructions for analyzing the scanned image data further comprise instructions for repeating the scanned image pixel location selecting instructions.

38. The storage medium of claim 37, wherein the instructions for generating the compensation parameter for each analyzed cross-process-direction image-forming device pixel location and for each analyzed gray level portion of that analyzed cross-process-direction image-forming device pixel location comprise instructions for generating a local tone reproduction curve value for that analyzed gray level value and for that analyzed cross-process-direction image-forming device pixel location that is usable in place of a generalized tone reproduction curve value for the image device, to convert input image data into printable image data such that the actual gray level value that is printed for that cross-process-direction image-forming device pixel location is substantially equivalent to the intended gray level value.

39. The storage medium of claim 38, further comprising instructions for determining streak defect magnitudes $\Delta D_{ijk}$ for a current iteration i, for each cross-process-direction image-forming device pixel location j and for each input gray level value k.

40. The storage medium of claim 39, further comprising:
  instructions for determining if all determined $\Delta D_{ijk}$ are less than a determined value E; and
  instructions for determining a new set of modifications $\Delta G_{ijk}$, if not all determined $\Delta D_{ijk}$ are less than a determined value E.

41. A method for printing a compensation pattern usable to determine a difference in gray level between an actual gray level value and an intended gray level value at a cross-process-direction image-forming device pixel location in the image, comprising:
  printing a plurality of gray level portions, each gray level portion having a gray level that is different from the other gray level portions and extending along the cross-process-direction, the plurality of gray level portions arranged along the process direction, and spaced from each other along the process direction such that a gap is provided between each pair of adjacent gray level portions; and
  printing a number of rows of fiducial marks, the rows of fiducial marks distributed among the plurality of gray level portions, at least one pair of fiducial marks in each row being separated by a whitespace, the rows of fiducial marks comprising at least some of:
    a first row of fiducial marks located before the plurality of gray level portions along the process direction,
    a second row of fiducial marks located after the plurality of gray level portions along the process direction, and
    at least one third row of fiducial marks, each third row of fiducial marks located in a gap between a pair of adjacent gray level portions.

* * * * *